United States Patent Office 2,976,269
Patented Mar. 21, 1961

2,976,269

ETHYLENE-SULFUR DIOXIDE POLYMERIZATION AND PRODUCT THUS OBTAINED

Jan Ide de Jong, Landenberg, Pa., assignor to E. I. du Pont de Nemours and Company, Wilmington, Del., a corporation of Delaware No Drawing. Filed Sept. 8, 1955, Ser. No. 533,257

5 Claims. (Cl. 260—79.3)

This invention relates to ethylene-sulfur dioxide interpolymers.

Heretofore, olefin-sulfur dioxide interpolymers have been prepared under a wide variety of reaction conditions. In general, the quantity of sulfur dioxide present initially has been relatively large, and the products have had a linear

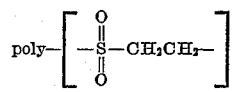

structure.

It has been discovered in accordance with the present invention that a novel interpolymer, having adjacent —$CH_2CH_2$— units in the chain is obtained by using a reaction mixture in which the partial pressure of sulfur dioxide is below the vapor pressure thereof, and the total pressure is within the range of about 600 to 3000 atmospheres.

Polymerization catalysts which may be employed in the practice of this invention include organic peroxy compounds, azo compounds such as those disclosed in U.S. Patent 2,471,959, and numerous ethylene polymerization catalysts such as those disclosed in U.S. Patent 2,299,220. The mol ratio of sulfur dioxide : ethylene which may be employed depends in part upon the polymerization temperature. For example, the vapor pressure of sulfur dioxide at 30° C. is about 3 atmospheres. At 3000 atmospheres pressure the maximum mol ratio of sulfur dioxide : ethylene at 30° C. would therefore be 1:1000. On the other hand, at 140° C. the vapor pressure of sulfur dioxide is about 60 atmospheres. At a total pressure of 600 atmospheres and a temperature of 140° C. the maximum mol ratio of sulfur dioxide is about 1:9. It is possible to employ temperatures within the range of 30° C. to 200° C., but from the standpoint of ease of operation, etc., it is generally preferred to carry out the interpolymerization at about 60° to 150° C. The minimum sulfur dioxide : ethylene ratio which may be used is extremely minute, but to produce a polymer which can be clearly distinguished from unmodified polyethylene, it is desirable to employ a ratio of at least 1:1000. A more striking distinction arises if the sulfur dioxide : ethylene mol ratio is initially at least 1:400, and the temperature is at least 60° C.

The process of the invention may be carried out either batchwise or continuously. No solvent for the monomers is present, as solvents generally prevent the formation of the novel type of interpolymer. In a preferred embodiment, the catalyst is introduced into the reaction vessel initially, and the monomers are thereafter injected. They may be injected through separate ports, but this is not essential. A suitable procedure is to introduce the sulfur dioxide into the vessel containing the catalyst, and thereafter to pressure the vessel with ethylene. The introduction of ethylene should be fairly rapid, and generally should not consume more than about ten minutes, for otherwise the ratio of monomers may not be in the necessary range during the time when appreciable reaction is taking place.

The temperatures used should be high enough to produce a reasonably short half life in the particular catalyst chosen. For most azo catalysts a temperature of at least 100° C. is sufficiently high to produce adequate activity. Higher temperatures may be used if desired. Many azo compounds and organic peroxides can be used at temperatures considerably below 60° C.

The invention is illustrated further by means of the following examples.

EXAMPLE I

Into a stainless steel shaker tube having a capacity of 330 ml. is placed 0.1 gram of alpha,alpha'-azo-bis(alpha, gamma dimethyl valeronitrile). The tube is cooled in Dry Ice, and into the cooled tube sulfur dioxide (4 grams) is introduced. The mixture is heated to 50° C. The vessel is then pressured with ethylene to a total pressure of 800 atmospheres. The time required for ethylene injection is 2 to 3 minutes. The reaction is permitted to continue at 85° C., 800 atmospheres, for about 2 hours. The vessel is thereupon cooled and opened, and the white solid polymer is withdrawn. This product (37 grams) is cut up, washed with methanol, and dried in vacuo. Extraction with boiling xylene removes polyethylene amounting to 10% of the total weight. The residual polymer could be pressed into a transparent, tough, stiff, cold-drawable film at 200° C., 20,000 p.s.i. (stiffness 127,000 p.s.i.).

EXAMPLE II

Example I was repeated, using, however, the reaction conditions set forth in the following table. The percent polyethylene in the product was measured by extraction with boiling xylene, and it was demonstrated that this method extracted at least 90% of the polyethylene. Since the 1:1 interpolymer which is obtained in the liquid phase reaction has 67% of $SO_2$, it is apparent from the data in the table that the interpolymer formed in these experiments, even after extraction of polyethylene, had a considerably lower content of the $SO_2$ component than the 1:1 interpolymer, and hence that the polymer contained adjacent ethylene units.

Table

VAPOR PHASE POLYMERIZATION OF SULFUR DIOXIDE WITH ETHYLENE

| Run No. | Monomers, Mol Ratio, Sulfur Dioxide: Ethylene | Catalyst | Weight Catalyst, Gram | Temp., °C. | Total Pressure, Atm. | Weight of Product, Grams | Weight Percent $SO_2$ in Product |
|---|---|---|---|---|---|---|---|
| 1 | 1:100 | A | 0.1 | 80 | 800 | 31 | 18 (20% polyethylene). |
| 2 | 1:150 | B | 0.07 | 130–175 | 900 | 46 | 8. |
| 3 | 1:200 | C | 0.1 | 80–130 | 800 | 48 | 8 (20% polyethylene). |
| 4 | 1:300 | A | 0.1 | 75–140 | 1,600–1,900 | 24 | 16% $SO_2$ (50% polyethylene). |
| 5 | 1:400 | B | 0.1 | 80–190 | 1,500–1,700 | 24 | 20 (50% polyethylene). |

A=alpha,alpha'-azo-bis (alpha,gamma dimethylvaleronitrile).
B=azodicyclohexane carbonitrile.
C=alpha,alpha'-azo-bis (isobutyronitrile).

It is to be understood, of course, that extraction of polyethylene from the product is not essential in practical operations. The advantages of the novel products of this invention are, in fact, exhibited quite advantageously in blends with polyethylene, such blends being stiffer than unblended polyethylene. In this respect, it is possible to approach or surpass the stiffness of linear polyethylene by blending ordinary non-linear polyethylene with the polymer obtained in the practice of this invention. The blends have stiffness properties, transparency, etc., of about the same order of magnitude as the unblended novel ethylene-sulfur dioxide interpolymers.

What is claimed is the following:

1. An ethylene-sulfur dioxide interpolymer having adjacent ethylene units in the interpolymer chain, and more than 50 mol percent of the —CH$_2$CH$_2$— component, said interpolymer having no components other than ethylene and sulfur dioxide.
2. A blend of polyethylene with the interpolymer set forth in claim 1.
3. A process for producing an ethylene-sulfur dioxide interpolymer having more than 50 mol percent of the ethylene component which comprises polymerizing sulfur dioxide with ethylene at a pressure of 600 to 3000 atmospheres, the partial pressure of sulfur dioxide being below its vapor pressure.
4. Process of claim 3, performed at a temperature of 30° to 200° C.
5. Process of claim 4, performed in the presence of an organic azo compound as catalyst.

References Cited in the file of this patent

UNITED STATES PATENTS

| | | |
|---|---|---|
| 2,411,722 | Harmon | Nov. 26, 1946 |
| 2,507,526 | Jacobson | May 16, 1950 |

FOREIGN PATENTS

| | | |
|---|---|---|
| 11,635 | Great Britain | May 6, 1915 |

OTHER REFERENCES

Snow et al.: Ind. Eng. Chem. 30, 176–182 (1938).